United States Patent
Miyawaki

(10) Patent No.: US 11,361,720 B2
(45) Date of Patent: Jun. 14, 2022

(54) DISPLAY DEVICE COMPRISING GRAYSCALE VOLTAGE OUTPUT UNIT THAT OUTPUTS CORRECTED GRAYSCALE VOLTAGE TO ONE SIGNAL LINE INCLUDING DISCONNECTION LOCATION

(71) Applicant: SAKAI DISPLAY PRODUCTS CORPORATION, Sakai (JP)

(72) Inventor: Shiro Miyawaki, Sakai (JP)

(73) Assignee: SAKAI DISPLAY PRODUCTS CORPORATION, Sakai (JP)

( * ) Notice: Subject to any disclaimer, the term of this patent is extended or adjusted under 35 U.S.C. 154(b) by 0 days.

(21) Appl. No.: 17/259,386

(22) PCT Filed: Jul. 13, 2018

(86) PCT No.: PCT/JP2018/026583
§ 371 (c)(1),
(2) Date: Jan. 11, 2021

(87) PCT Pub. No.: WO2020/012654
PCT Pub. Date: Jan. 16, 2020

(65) Prior Publication Data
US 2021/0280144 A1   Sep. 9, 2021

(51) Int. Cl.
*G09G 3/36* (2006.01)
*G02F 1/1362* (2006.01)

(52) U.S. Cl.
CPC ..... *G09G 3/3607* (2013.01); *G02F 1/136286* (2013.01); *G09G 3/3696* (2013.01)

(58) Field of Classification Search
CPC ............... G09G 3/3607; G09G 3/3696; G02F 1/136286
See application file for complete search history.

(56) References Cited

U.S. PATENT DOCUMENTS

| 2008/0316406 A1* | 12/2008 | Inoue | G02F 1/1337 |
| | | | 349/123 |
| 2009/0015572 A1* | 1/2009 | Matsui | G09G 3/3688 |
| | | | 345/204 |
| 2017/0372672 A1 | 12/2017 | Shiomi | |

FOREIGN PATENT DOCUMENTS

| JP | H02-170123 A | 6/1990 | |
| JP | H11-30772 A | 2/1999 | |
| WO | 2008/047495 A1 | 4/2008 | |
| WO | WO-2008047495 A1 * | 4/2008 | ............... G09G 3/20 |
| WO | 2016/117390 A1 | 7/2016 | |

* cited by examiner

*Primary Examiner* — Kwang-Su Yang
(74) *Attorney, Agent, or Firm* — ScienBiziP, P.C.

(57) ABSTRACT

A grayscale voltage output unit outputs, for a signal line including a disconnection location, a first grayscale voltage to a first signal line portion, the first grayscale voltage being corrected to be lower than the grayscale voltage to be output to the signal line on the basis of the location of the disconnection location and the wiring resistance of the signal line, and the grayscale voltage output unit outputs a second grayscale voltage to a second signal line portion, the second grayscale voltage being corrected from the grayscale voltage to be output to the signal line on the basis of the location of the disconnection location, the wiring resistance of the signal line, and the wiring resistance of spare wiring. Thereby, a display device with a simple configuration capable of reducing luminance deviation along a signal line with a disconnection location is provided.

7 Claims, 8 Drawing Sheets

DISPLAY DEVICE COMPRISING GRAYSCALE VOLTAGE OUTPUT UNIT THAT OUTPUTS CORRECTED GRAYSCALE VOLTAGE TO ONE SIGNAL LINE INCLUDING DISCONNECTION LOCATION

TECHNICAL FIELD

The invention relates to a display apparatus.

BACKGROUND ART

Conventionally, a display apparatus, in which a source bus wiring in which a disconnection defect occurred and a redundant wiring are connected to repair the disconnection defect of the source bus wiring has been offered (JP H11-030772 A (see Patent document 1, for example)).

The above-described display apparatus makes it possible to display beyond the disconnection location by using the redundant wiring instead of the source bus wiring in which the disconnection defect occurred.

PRIOR ART DOCUMENT

Patent Document

Patent Document 1: JP H11-030772 A

SUMMARY OF THE INVENTION

Problem to be Solved by the Invention

In the above-described display apparatus, the drive capability of an output buffer to drive a source bus wiring connected to a redundant wiring is controlled such that the display state of a pixel connected to a source bus wiring in which a disconnection defect or a short-circuit defect is repaired is brought to be the same as that of a pixel connected to a normal source bus wiring.

However, there is a problem that, in the above-described display apparatus, a circuit to control the drive capability for each output buffer and a circuit to generate a control signal therefor is needed, so that the circuit configuration becomes complicated.

Then, a problem to be solved by the invention is to provide a display apparatus that makes it possible, in a simple configuration, to reduce luminance deviation along a signal line in which the disconnection location is present.

Means to Solve the Problem

A display apparatus according to one aspect of the invention comprises:
a plurality of display elements arranged in a matrix in a display region of a substrate;
a plurality of signal lines connected for each row or each column of the plurality of display elements; and
a grayscale voltage output unit to output, to each one of the plurality of signal lines, a grayscale voltage based on a video signal, wherein
a signal line including a disconnection location in the plurality of signal lines is divided into a first signal line portion from the grayscale voltage output unit to the disconnection location and a second signal line portion from the disconnection location to a terminating end, a terminating end side with the terminating end of the second signal line portion is connected to the grayscale voltage output unit via a spare wiring, and
the grayscale voltage output unit:
outputs, for the signal line including the disconnection location, a first grayscale voltage to the first signal line portion, the first grayscale voltage being corrected based on a position of the disconnection location and a wiring resistance of the signal line so as to be lower than the grayscale voltage to be output to the signal line; and
outputs, for the signal line including the disconnection location, a second grayscale voltage to the second signal line portion, the second grayscale voltage being obtained by correcting the grayscale voltage to be output to the signal line based on the position of the disconnection location, a wiring resistance of the signal line, and a wiring resistance of the spare wiring.

Effects of the Invention

According to the invention, it is possible to reduce, in a simple configuration, luminance deviation along the signal line including the disconnection location.

EMBODIMENT FOR CARRYING OUT THE INVENTION

Figure 1:
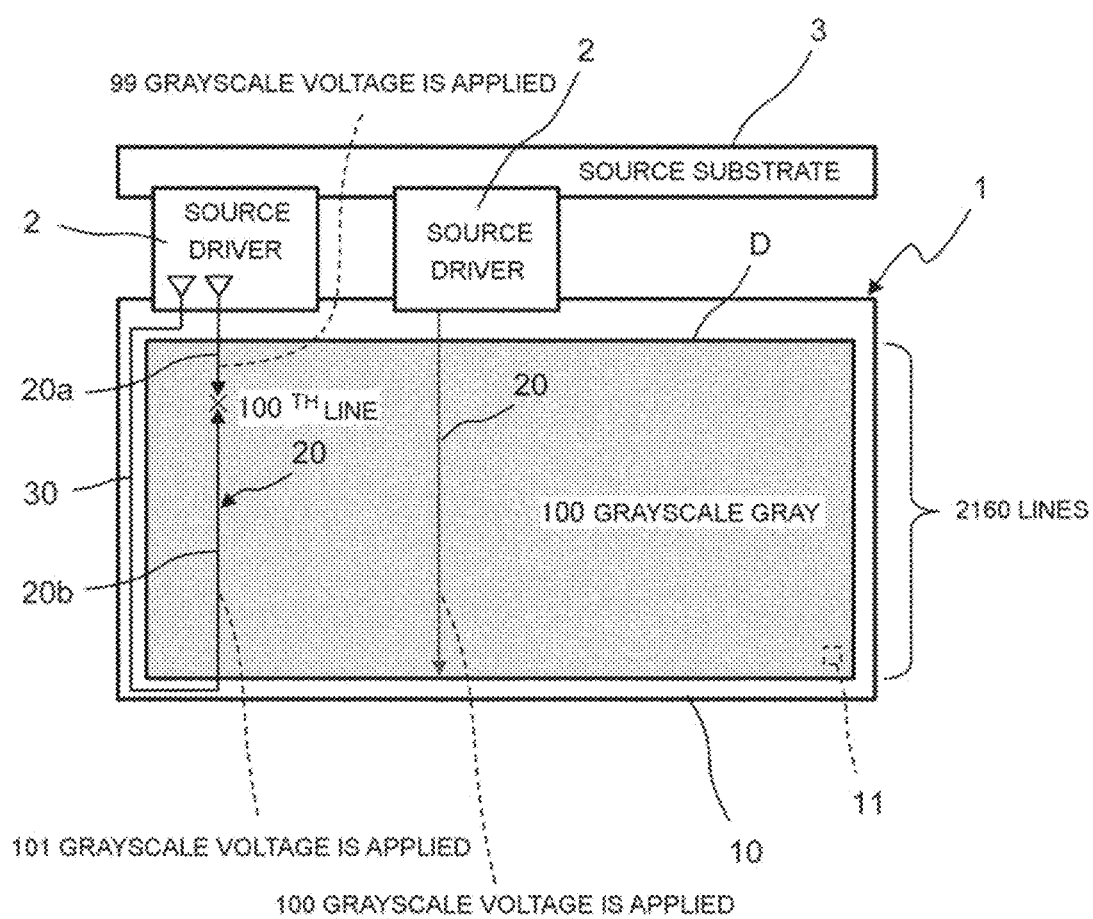
FIG. 1 shows a block diagram of a main part of a display apparatus according to a first embodiment of the invention.

Below, a display apparatus according to the invention will be described in further detail according to the embodiments shown. Throughout a plurality of drawings, the same reference numerals are given to the same constituting elements.

First Embodiment

FIG. 1 shows a block diagram of a main part of a display apparatus according to a first embodiment of the invention.

As shown in FIG. 1, a display apparatus according to a first embodiment comprises: a liquid crystal panel portion 1; a plurality of source drivers 2; and a source substrate 3. The liquid crystal panel portion 1 comprises: a TFT (thin film transistor) side glass substrate 10; a CF (color filter) side glass substrate (not shown) arranged with a gap with respect to the TFT side glass substrate 10 so as to face the front side of the TFT side glass substrate 10; and a liquid crystal layer (not shown) sealed between the TFT side glass substrate 10 and the CF side glass substrate.

Moreover, the liquid crystal panel portion 1 comprises a plurality of pixels (not shown) arranged in a matrix at the front side of the TFT side glass substrate 10. A display region D is formed at the front of the liquid crystal panel portion 1 by the plurality of pixels. In this embodiment, a so-called 4K2K liquid crystal panel whose horizontal and vertical resolutions are 3840 and 2160, respectively, is used for the liquid crystal panel portion 1.

A plurality of gate lines (not shown) extending in the horizontal direction are provided at the front side of the TFT side glass substrate 10 in a mutually parallel manner with a gap therebetween. Each one of the plurality of pixels lined up in the horizontal direction is connected to each of the gate lines.

Furthermore, a first gate driver (not shown) to which the left end of each of the gate lines is connected is provided at the left side end of the front side of the TFT side glass substrate 10. Moreover, a second gate driver (not shown) to which the right end of each of the gate lines is connected is provided at the right side end of the front side of the TFT side glass substrate 10.

A plurality of source lines (not shown) 20 extending in the vertical direction are provided at the front side of the TFT side glass substrate 10 in a mutually parallel manner with a gap therebetween. Each of the plurality of pixels lined up in the vertical direction is connected to each of the source lines 20. The plurality of source lines 20 are provided in a layer different from that for the plurality of gate lines and intersect the plurality of gate lines via an insulating layer. The plurality of source lines 20 represent one example of the plurality of signal lines.

The plurality of source drivers 2 arrayed along the upper side of the TFT side glass substrate 10 is connected to the source lines 20, respectively. Moreover, the source substrate 3 having a rectangular shape and extending along the upper side of the TFT side glass substrate 10 is arranged, and the side being opposite to the TFT side glass substrate 10 of the plurality of source drivers 2 is connected to the source substrate 3.

Each pixel of the liquid crystal panel portion 1 comprises a pixel electrode (not shown) provided in the TFT side glass substrate 10 and a thin film transistor 11 (display element), a counter electrode (not shown) provided in the CF side glass substrate, and a liquid crystal layer (not shown) sealed in between the pixel electrode and the counter electrode. A counter reference voltage Vcom is applied to the counter electrode.

The source line 20 including the disconnection location in the plurality of source lines 20 (signal lines) comprises a first source line portion 20a (first signal line portion) from the source driver 2 to the disconnection location and a second source line portion 20b (second signal line portion) from the disconnection location to the terminating end. The terminating end of the second source line portion 20b (second signal line portion) is connected to the source driver 2 via a spare wiring 30.

The spare wiring 30 is provided in a plurality in the TFT side glass substrate 10 and is used for each of the source lines 20 including the disconnection location. The terminating end of the source line 20 in which a disconnection occurred is welded to the selected spare wiring 30 using irradiation of laser, thereby a grayscale voltage can be applied to the second source line portion 20b (second signal line portion) at and beyond the disconnection location, and a disconnection defect can be repaired.

Figure 2:
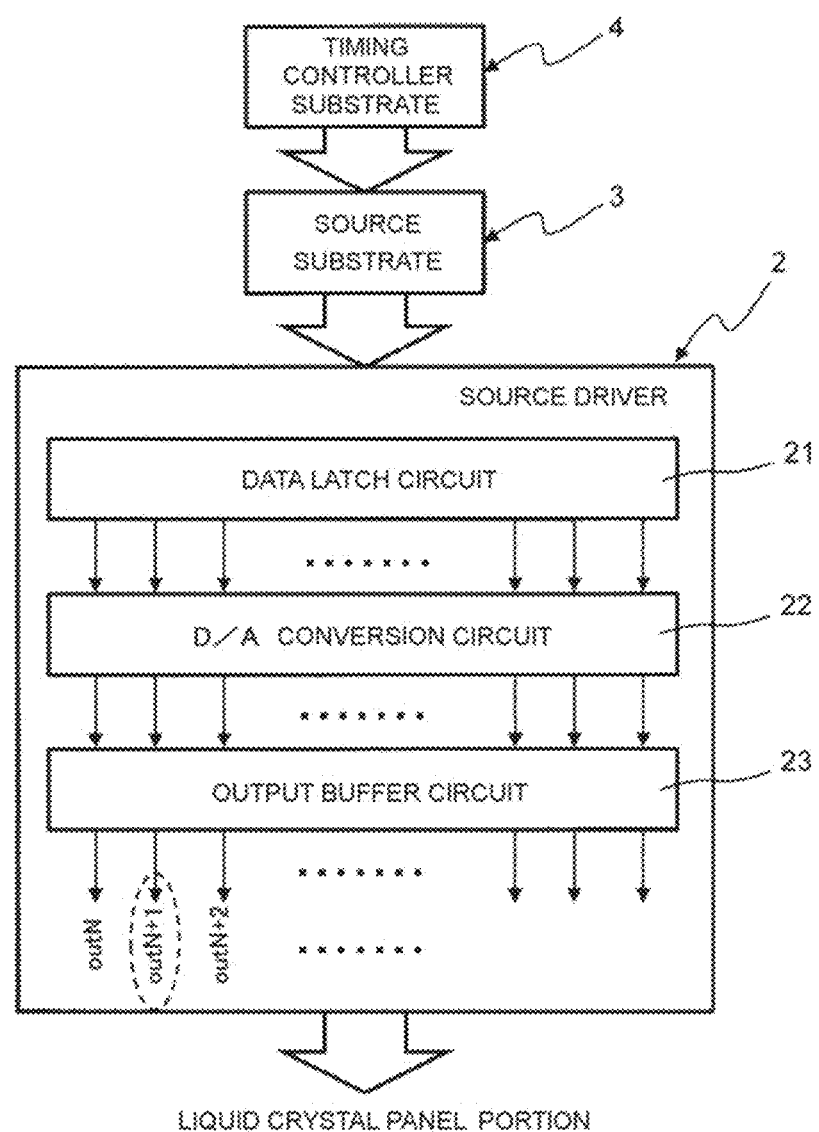
FIG. 2 is a block diagram of a source driver according to the first embodiment.

FIG. 2 is a block diagram of the source driver 2.

As shown in FIG. 2, the source driver 2 comprises a data latch circuit 21 to hold display data output from a timing controller substrate 4; a D/A conversion circuit 22 to D/A (digital/analog) convert display data held in the data latch circuit 21; and an output buffer circuit 23 to output analog data outN, outN+1, outN+2, . . . from the D/A conversion circuit 22.

Figure 3:
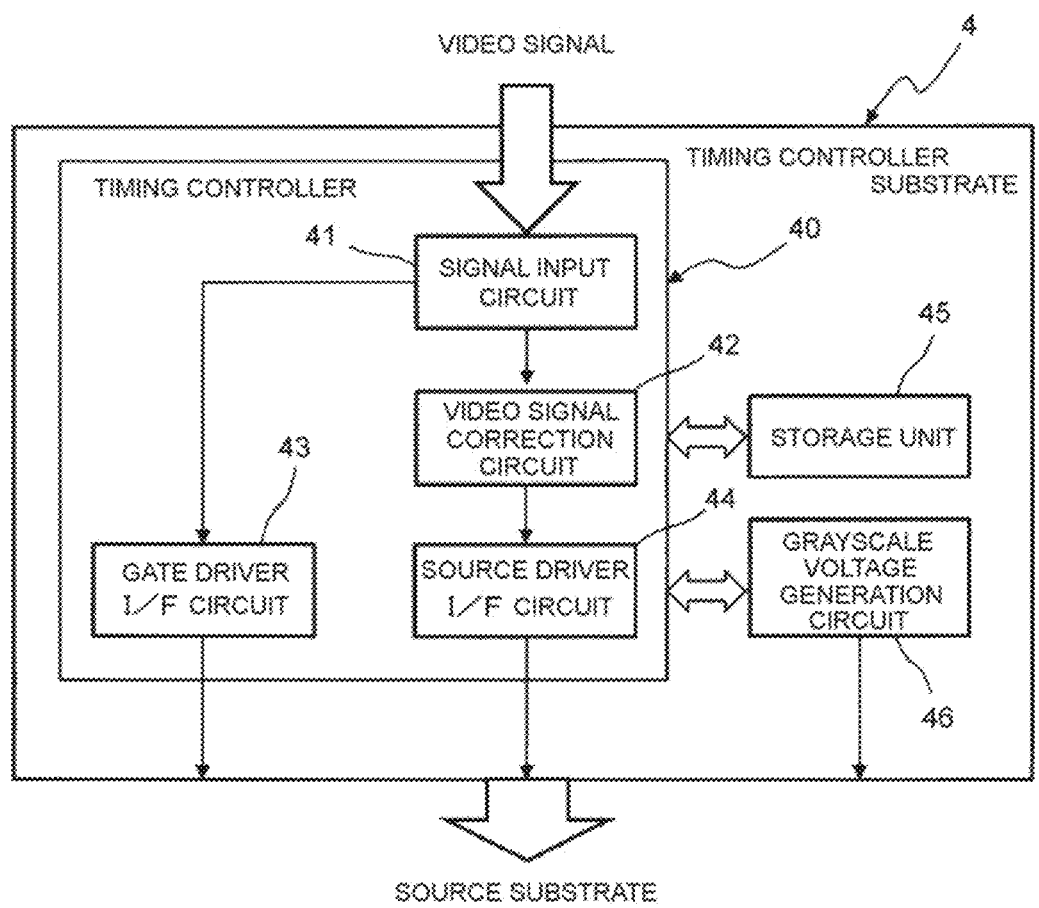
FIG. 3 is a block diagram of a timing controller according to the first embodiment.

Moreover, FIG. 3 is a block diagram of the timing controller substrate 4.

As shown in FIG. 3, the timing controller substrate 4 comprises a signal input circuit 41 to which a video signal is input; a video signal correction circuit 42; a gate driver I/F circuit 43; a source driver I/F circuit 44; a storage unit 45; and a grayscale voltage generation circuit 46. The timing controller 40 is constituted by the signal input circuit 41; the video signal correction circuit 42; the gate driver I/F circuit 43; and the source driver I/F circuit 44.

The signal input circuit 41 is a serial interface for image transmission (V-by-One (registered trademark) Receiver) to serialize digital data of RGB 10 bits being a video signal.

The video signal correction circuit 42 outputs grayscale voltage data to the source driver I/F circuit 44 based on a control signal from the signal input circuit 41. Here, the video signal correction circuit 42 outputs, to the source driver I/F circuit 44, grayscale voltage data corrected for the source line 20 including a disconnection location, based on the coordinates (x, y) of the disconnection location stored in the storage unit 45 and a wiring resistance R of the source line 20.

With an input signal from the signal input circuit 41 as a reference, the gate driver I/F circuit 43 generates a control signal for a gate driver (Gate clock, Gate start pulse, Gate slope) to output the generated control signal to the first and second gate drivers.

The source driver I/F circuit 44 converts the corrected grayscale voltage data from the video signal correction circuit 42 to a signal for a source driver to output the converted results to the source driver 2.

The storage unit 45 stores the coordinates (x, y) of the disconnection location, the wiring resistance R of the source line 20, and a wiring resistance R3 of the spare wiring 30, for each of the source lines 20 including the disconnection location. Here, x in the coordinates (x, y) corresponds to column numbers 1 to 3840 of the source line 20 in the column direction (vertical direction), while y corresponds to row numbers 1 to 2160 in the row direction (horizontal direction). Row number y in the display apparatus according to a third embodiment corresponds to between line 1 being the topmost row to line 2160 being the bottommost row.

The grayscale voltage generation circuit 46 outputs, as a fixed value to the source driver 2 from an internal memory or timing controller, a voltage determined in advance for each liquid crystal panel portion 1.

The timing controller substrate 4 adjusts the light transmittance of the liquid crystal layer in each pixel and determines the display luminance in each pixel by controlling, through the first and second gate drivers and the source driver 2, the magnitude of the grayscale voltage to be applied to each pixel electrode.

The timing controller substrate 4 and the source substrate 3 and the source driver 2 constitute the grayscale voltage output unit.

Figure 4:
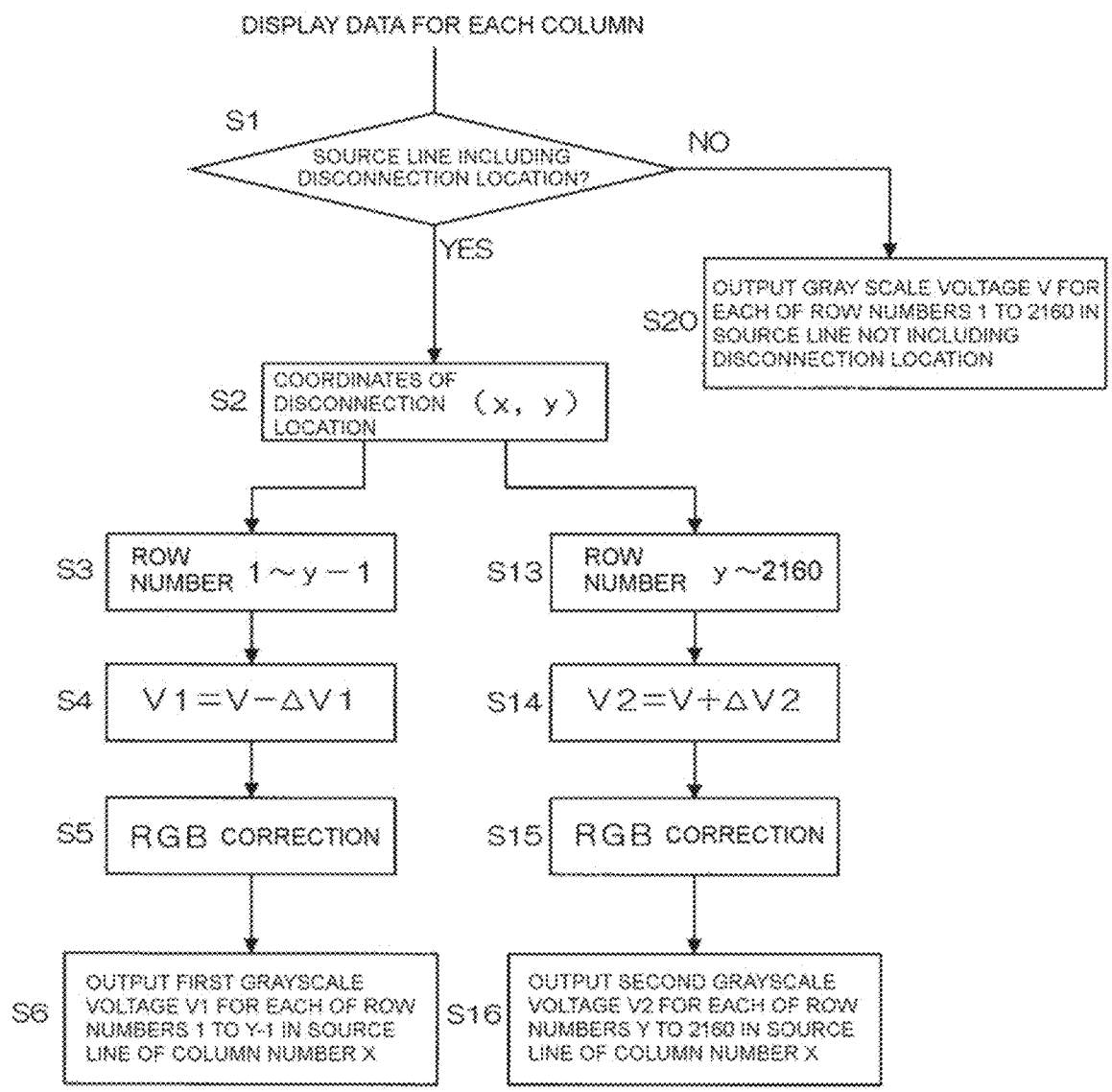
FIG. 4 is a flowchart according to the first embodiment.

Next, an operation of the timing controller substrate 4 is explained in accordance with the flowchart in FIG. 4.

First, in step S1, the timing controller substrate 4 determines whether display data input for each one column is to be output to the source line 20 including the disconnection location. Here, the display data input is RGB 10-bit digital data being a video signal input to the signal input circuit 41.

Then, when it is determined, in Step S1, that the display data input for each one column is to be output to the source line 20 including the disconnection location, the process proceeds to Step S2 in which coordinates (x, y) of the disconnection location, or, in other words, a column number x of the source line 20 including the disconnection location and a row number y of the disconnection location of the source line 20, is obtained from the storage portion 40. Here, a disconnection is assumed to be present between a row number y−1 and row number y in the source line 20.

Next, for row numbers 1 to y−1, the process proceeds to step S3 for the first source line portion 20a (first signal line portion) of the source line 20 including the disconnection location, while, for row numbers y to 2160, the process proceeds to step S13 for the second source line portion 20b (second signal line portion) of the source line 20 including the disconnection location.

Then, in step S4, a correction voltage $\Delta V1$ is determined from a wiring length L1 of the first source line portion 20a to set a first grayscale voltage $V1 \times V - \Delta V1$ for each of row numbers 1 to y−1. Here, the wiring length L1 of the first source line portion 20a is determined from the wiring length L of the source line 20 and row number y indicating the position of the disconnection location.

Next, the process proceeds to step S5 in which correction is carried out for each RGB pixel line with respect to the first grayscale voltage V1 and then the process proceeds to step S6 in which the first grayscale voltage V1 for each of row numbers 1 to y−1 in the source line of the column number x is output.

Moreover, in step S14 following step S13, a correction voltage $\Delta V2$ is determined from a wiring resistance R3 of the spare wiring 30 and a wiring length L2 of the second source line portion 20b to set a second grayscale voltage $V2=V+\Delta V2$ for each of row numbers y to 2160. Here, a wiring length L2 of the second source line portion 20b is determined from a wiring length L of the source line 20 and row number y indicating the position of the disconnection location.

Furthermore, in step S15, correction is carried out with respect to the second grayscale voltage V2 for each of the RGB pixel lines and then the process proceeds to step S16 in which the second grayscale voltage V2 is output for each of row numbers y to 2160 in the source line 20 of a column number x.

On the other hand, when it is determined that the display data input is to be output to the source line 20 not including a disconnection location, the process proceeds to step S20 in which a gray scale voltage V of the display data is output as it is.

For example, in FIG. 1, the disconnection location of the source line 20 of the column number x including the disconnection location is assumed to be row number 100. Here, in a case that 100 grayscale gray is displayed by all pixels of the display region D, row numbers 1 to 99 in the column number x display 99 grayscale gray after correction, while row numbers 100 to 2160 display 101 grayscale gray after correction.

Figure 5:
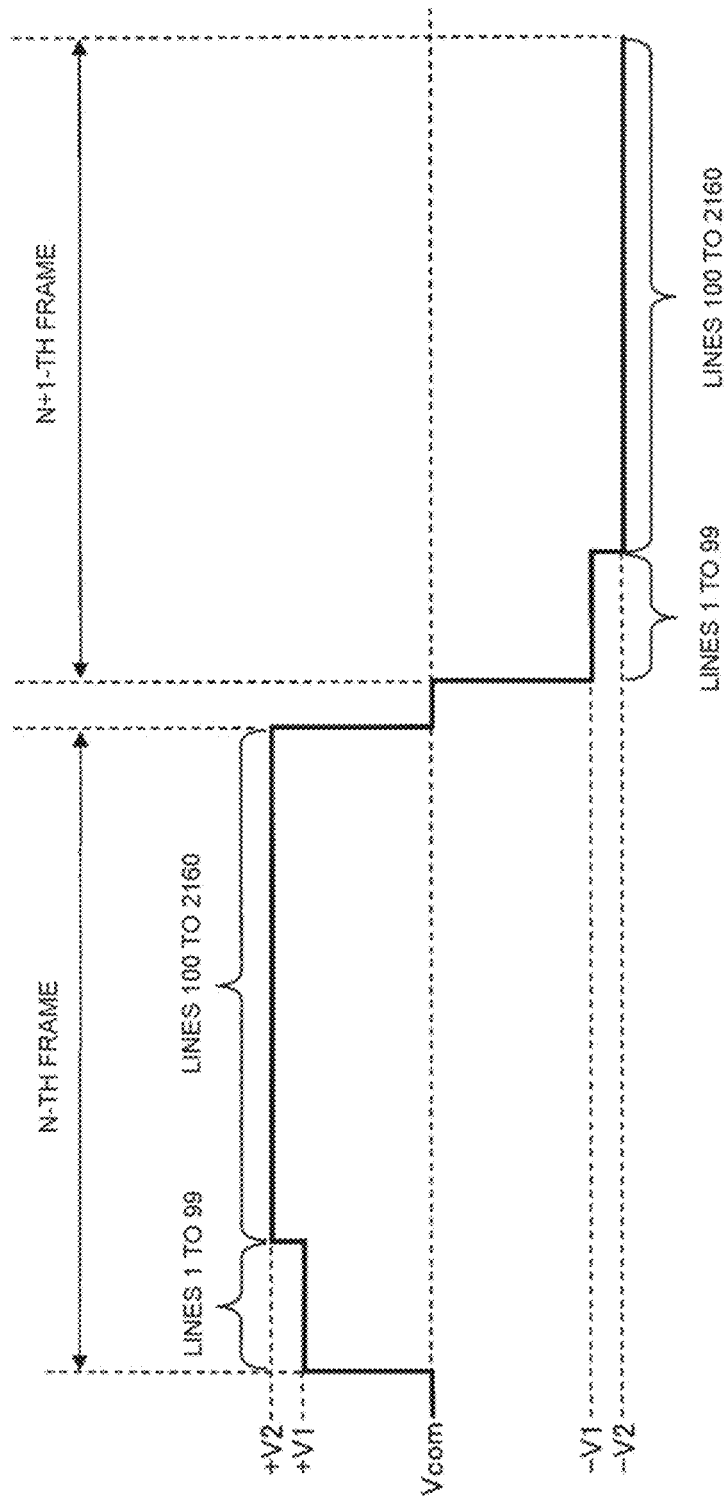
FIG. 5 is a timing chart of output of the source driver in a frame reverse driving technique according to the first embodiment.

FIG. 5 is a timing chart of output of the source driver 2 in a case that 100 grayscale gray is displayed by all pixels in the display region D under a frame reverse driving technique.

As shown in FIG. 5, in the display apparatus according to the first embodiment under the frame reverse driving technique, the first gray scale voltage V1 for row numbers 1 to 99 ("lines 1 to 99" in FIG. 5) and the second gray scale voltage V2 for row numbers 100 to 2160 ("lines 100 to 2160" in FIG. 5) are reversed between an N-th frame and an N+1-th frame (where N is a positive integer) with a counter reference voltage Vcom as a reference.

According to the first embodiment, in the source line 20 including the disconnection location, each of the correction voltage $\Delta V1$ for row numbers 1 to y−1 and the correction voltage $\Delta V2$ for row numbers y to 2160 for each source line 20 is set to be constant.

According to the display apparatus having the above-described configuration, in the plurality of source lines 20 (signal lines) connected to the plurality of thin film transistors 11 (display elements) for each column, in a case that a disconnection is present in the source line 20, the terminating end side of the second source line portion 20b (second signal line portion) separated from the first source line portion 20a (first signal line portion) due to the disconnection is connected to a grayscale voltage output unit (the source driver 2, the source substrate 3, and the timing controller substrate 4) via the spare wiring 30. Then, for the source line 20 including the disconnection location, the first grayscale voltage V1 being corrected based on the position (row number) of the disconnection location and the wiring resistance R of the source line 20 including the disconnection location so as to be lower than the grayscale voltage V to be output to the source line 20 is output to the first source line portion 20a (the first signal line portion), and the second grayscale voltage V2 is output to the second source line portion 20b (second signal line portion), the second grayscale voltage V2 being obtained by correcting the grayscale voltage V to be output to the source line 20 based on the position (row number) of the disconnection location and the wiring resistance R of the source line 20 including the disconnection location and the wiring resistance R3 of the spare wiring 30. In this way, luminance deviation along the source line 20 including the disconnection can be reduced in a simple configuration.

Here, the first grayscale voltage V1 and the second grayscale voltage V2 can be determined taking into account their respective wiring capacitance up to the disconnection locations. For example, as the wiring gets shorter, the wiring capacitance decreases and the time required for charging decreases, resulting in a brighter appearance corresponding to an amount of increase in the time during which charging in one frame is completed, so that the first grayscale voltage V1 and the second grayscale voltage V2 are corrected so as to reduce the change in brightness due to the wiring capacitance.

While the wiring resistance R3 of the spare wiring 30 is set to have a constant value according to the first embodiment, it can be set to have a resistance value being different for each of the source lines 20 including the disconnection location. In this case, the resistance value R3 of the spare wiring 30 is stored in the storage unit 45 for each of the source lines 20 including the disconnection location.

Moreover, the wiring resistance R1 of the first source line portion 20a (first signal line portion) and the wiring resistance R2 of the second source line portion 20b (second signal line portion) are determined from the position (row number) of the disconnection location and the wiring resistance R of the source line 20 in the timing controller substrate 4.

In other words, determining the wiring length L1 of the first source line portion 20a and the wiring length L2 of the second source line portion 20b from the position (row number) of the disconnection location allows obtaining the ratio L1/(L1−L2) of the wiring length L1 of the first source line portion 20a relative to the wiring length L of the source line 20 and the ratio L2/(L1+L2) of the wiring length L2 of the second source line portion 20b relative to the wiring length L of the source line 20.

In this way, the wiring resistance R1 of the first source line portion 20a is determined by $$R1=R \times L1/(L1+L2).$$

Moreover, the wiring resistance R2 of the second source line portion 20b is determined by $$R2=R \times L/(L1+L2).$$

The grayscale voltage output unit (the source driver 2, the source substrate 3, and the timing controller substrate 4) outputs, to the first source line portion 20a, the first grayscale voltage V1(=V−ΔV1) being corrected based on the wiring resistance R1 of the first source line portion 20a for each signal line 20 including the disconnection location. Moreover, the grayscale voltage output unit (the source driver 2, the source substrate 3, and the timing controller substrate 4) outputs, to the second source line portion 20b, the second grayscale voltage V2(=V+ΔV2) being corrected based on the wiring resistance R2 of the second source line portion 20b and the wiring resistance R3 of the spare wiring 30. In this way, luminance deviation between the first source line portion 20a and the second source line portion 20b in the source line 20 being disconnected can be reduced.

Moreover, the grayscale voltage output unit (the source driver 2, the source substrate 3, and the timing controller substrate 4) corrects the first grayscale voltage V1 and the second grayscale voltage V2 in accordance with each primary color of three RGB primary colors. In this way, luminance deviation for each primary color can be reduced.

Even in a case in which the liquid crystal panel portion displays in four RGBW primary colors or four RGBY primary colors, the first grayscale voltage V1 and the second grayscale voltage V2 are also similarly corrected in accordance with each of the primary colors.

While each of the correction voltage ΔV1 for row numbers 1 to y−1 and the correction voltage ΔV2 for row numbers y to 2160 is set to be constant in the source line 20 including the disconnection location in the first embodiment, as in the following second embodiment, the gray scale voltage V can be corrected by determining the correction voltages ΔV1, ΔV2 for each of the thin film transistors 11 (display elements) to be selected successively in the source line 20 including the disconnection location.

Moreover, while the liquid crystal panel portion 1 in which a plurality of display elements are connected, for each column, to the source line 20 as a signal line is provided in the first embodiment, the invention can be applied to a display apparatus in which a plurality of display elements are connected, for each row, to a plurality of signal lines.

Second Embodiment

A display apparatus according to a second embodiment has the same configuration as that of the display apparatus according to the first embodiment except for the operation of the timing controller substrate 4, so that FIGS. 1 and 2 are referred to.

In the display apparatus according to the second embodiment, a correction voltage ΔV1 is determined based on a wiring resistance R1 of a first source line portion 20a (first signal line portion) and the position of a thin film transistor 11 for each of the thin film transistors (display elements) connected to the first source line portion 20a (first signal line portion). Then, a corrected first grayscale voltage V1(=V−ΔV1) is output to the first source line portion 20a (first signal line portion) via a source substrate 3 and a source driver 2 from a timing controller substrate 4.

Moreover, a correction voltage ΔV2 is determined based on a wiring resistance R2 of a second source line portion 20b (second signal line portion) and a wiring resistance R3 of a spare wiring 30, and the position of the thin film transistor 11 for each of the thin film transistor 11 connected to a second source line portion 20b (second signal line portion). Then, a corrected second grayscale voltage V2(=V+ΔV2) is output to the second source line portion 20b (second signal line portion) via the source substrate 3, the source driver 2, and the spare wiring 30 from the timing controller substrate 4.

In this way, luminance deviation for each row in a source line (signal line) 20 including the disconnection can be reduced.

Here, the thin film transistor 11 (display element) to be selected is a thin film transistor 11 selected via a gate line by first and second gate drivers controlled by the timing controller substrate 4.

Figure 6:
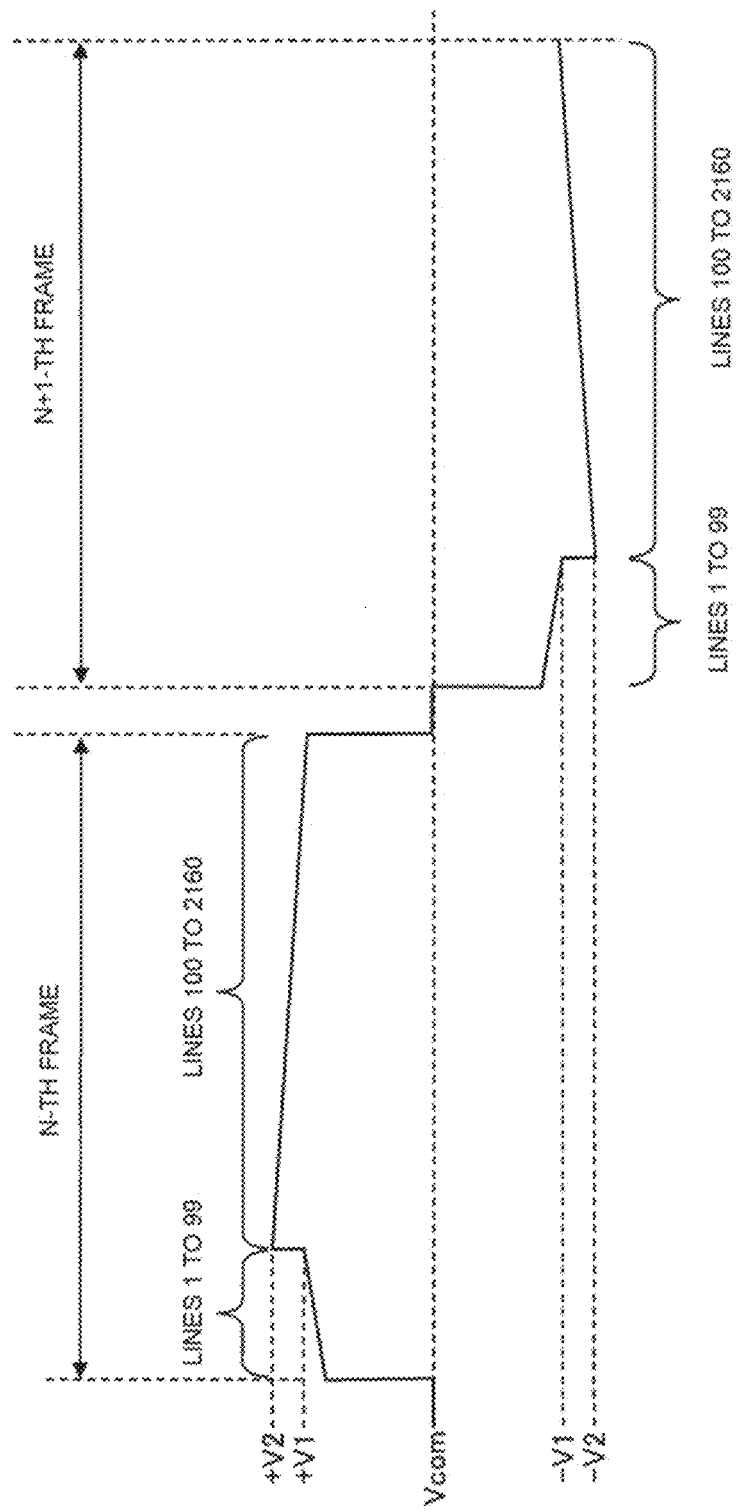
FIG. 6 is a timing chart of output of the source driver of the display apparatus in a frame reverse driving technique according to a second embodiment of the invention.

FIG. 6 is a timing chart of output of the source driver 2 in a case that 100 grayscale gray is displayed by all pixels of a display region D under a frame reverse driving technique.

As shown in FIG. 6, in the display apparatus according to the second embodiment under the frame reverse driving technique, for row numbers 1 to 99 ("lines 1 to 99" in FIG. 6), the grayscale voltage increases gradually from row number 1 and is brought to be the first grayscale voltage V1 for row number 99. Moreover, for row numbers 100 to 2160 ("lines 100 to 2160" in FIG. 6), the grayscale voltage decreases gradually from the second grayscale voltage V2 for row number 100 to a grayscale voltage for row number 2160.

The graph of the grayscale voltage for row numbers 1 to 99 and the grayscale voltage for row numbers 100 to 2160 is reversed between an N-th frame and an N+1-th frame (where N is a positive integer) with a counter reference voltage Vcom as a reference.

Third Embodiment

Figure 7:
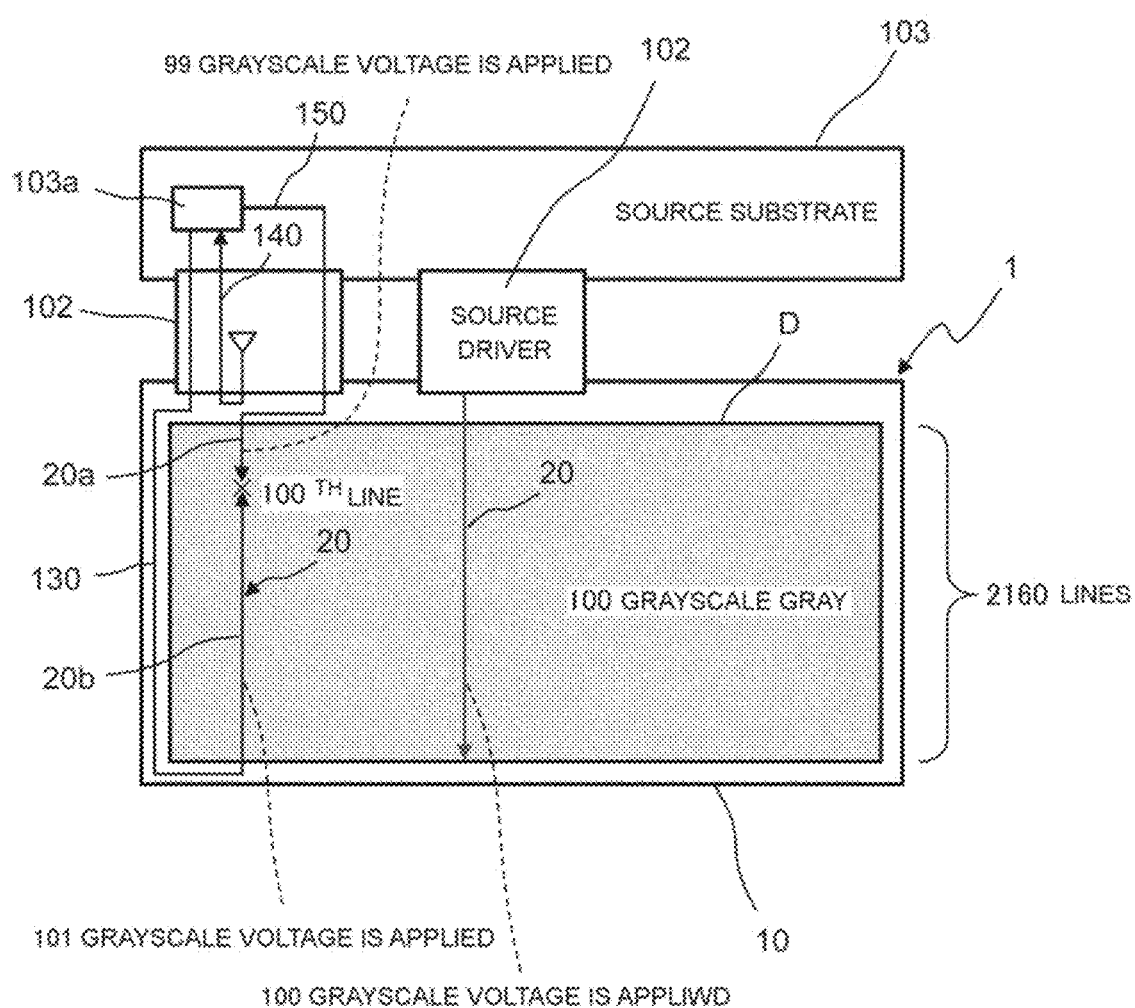
FIG. 7 shows a block diagram of the main part of the display apparatus according to a third embodiment of the invention.
Figure 8:
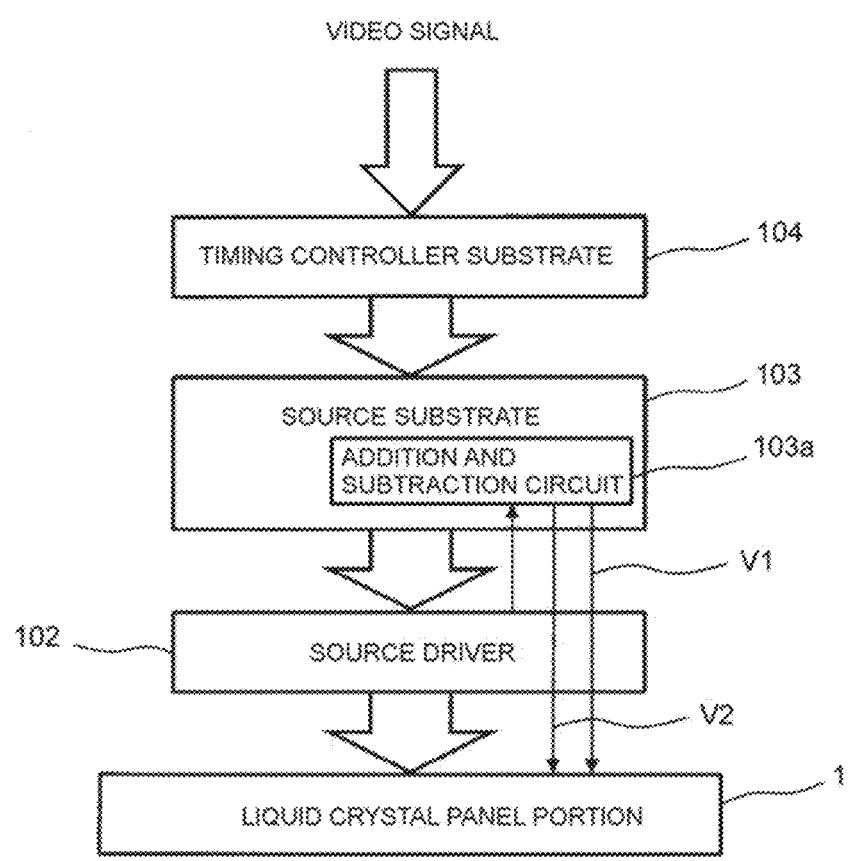
FIG. 8 is a schematic diagram for explaining an addition and subtraction circuit according to the third embodiment.

FIG. 7 shows a block diagram of the main part of the display apparatus according to a third embodiment of the invention, and FIG. 8 is a schematic diagram for explaining an addition and subtraction circuit 103a according to the third embodiment.

As shown in FIGS. 7 and 8, the display apparatus according to the third embodiment comprises a liquid crystal panel portion 1, a plurality of source drivers 102, a source substrate 103, and a timing controller substrate 104.

A plurality of source lines 20 extending in the vertical direction are provided, at the front side of the TFT side glass substrate 10 of the liquid crystal panel portion 1, in a mutually parallel manner with a gap therebetween. Each of a plurality of pixels lined up in the vertical direction is connected to each of the source lines 20. Moreover, the plurality of source drivers 102 arrayed along the upper side of the TFT side glass substrate 10 is connected to the source lines 20, respectively. Moreover, the source substrate 103 having a rectangular shape and extending along the upper side of the TFT side glass substrate 10 is arranged, and the side being opposite to the TFT side glass substrate 10 of the plurality of source drivers 102 is connected to the source substrate 103.

The third embodiment differs from the display apparatus according to the first embodiment in that first and second grayscale voltages V1, V2 corrected by an addition and subtraction circuit 103a of the source substrate 103 are output for the source line 20 including the disconnection location.

In the liquid crystal panel portion 1, the source line 20 including the disconnection location in the plurality of source lines 20 (signal lines) comprises a first source line portion 20a (first signal line portion) being from the starting end that has been disconnected from the source diver 102 to the disconnection location and a second source line portion 20b (second signal line portion) from the disconnection location to the terminating end.

The output of the source driver 102 separated from the starting end of the first source line portion 20a is connected to the addition and subtraction circuit 103a via a detouring wiring 140. Moreover, a terminal from which the first grayscale voltage V1 of the addition and subtraction circuit 103a is output is connected to the starting end of the first source line portion 20a via the detouring wiring 150 and the source driver 102. Moreover, the terminating end of the second source line portion 20b (second signal line portion) is connected, via the spare wiring 130 and the source driver 102, to a terminal from which the second grayscale voltage V2 of the addition and subtraction circuit 103 is output.

The addition/subtraction circuit 103a outputs, for the source line 20 including the disconnection location, the first grayscale voltage V1 being corrected based on the position (row number) of the disconnection portion and a wiring resistance R of the source line including the disconnection location so as to be lower than the grayscale voltage V to be output to the source line 20; and the second grayscale voltage V2 corrected based on the position (row number) of the disconnection portion, the wiring resistance R of the source line 20 including the disconnection portion, and a wiring resistance R3 of the spare wiring 130 so as to be higher than the grayscale voltage V to be output to the source line 20.

The spare wiring 130 is provided in the TFT side glass substrate 10 in a plurality and is used for each of the source lines 20 including the disconnection location. The terminating end of the source line 20 in which a disconnection occurred is welded to the selected spare wiring 130 using irradiation of laser, thereby a grayscale voltage can be applied to the second source line portion 20b (second signal line portion) at and beyond the disconnection location, and a disconnection defect can be repaired.

In FIG. 7, in the same manner as in the first embodiment, the disconnection location of the source line 20 of column number x including the disconnection location is assumed to have row number 100. Here, in a case that 100 grayscale gray is displayed by all pixels of a display region D, row numbers 1 to 99 in the column number x display 99 grayscale gray after correction, while row numbers 100 to 2160 display 101 grayscale gray after correction.

The display apparatus according to the third embodiment has the same advantageous effect as the display apparatus according to the first embodiment.

Moreover, while a display apparatus comprising the liquid crystal panel portion 1 is described in the first to third embodiments, the invention can be applied to a display apparatus having a different configuration.

While specific embodiments of the invention are described, the invention is construed to be not limited to the first to third embodiments, so that it can be embodied by carrying out a variety of changes within the scope of the invention. For example, an appropriate combination of what are recited in the first to third embodiments can be configured to be one embodiment of the invention.

The invention and embodiments can be summarized as follows:

A display apparatus according to one aspect of the invention comprises:

a plurality of display elements 11 arranged in a matrix in a display region D of a substrate 10;

a plurality of signal lines 20 connected for each row or for each column of the plurality of display elements 11; and a grayscale voltage output unit (2, 3, 4, 102, 103, 104) to output, to each one of the plurality of signal lines 20, a grayscale voltage based on a video signal, wherein the signal line 20, including a disconnection location in the plurality of signal lines 20 is divided into a first signal line portion 20a from the grayscale voltage output unit (2, 3, 4, 102, 103, 104) to the disconnection location and a second signal line portion 20b from the disconnection location to a terminating end, a terminating end side with the terminating end of the second signal line portion 20b is connected to the grayscale voltage output unit (2, 3, 4, 102, 103, 104) via a spare wiring 30, 130, and the grayscale voltage output unit (2, 3, 4, 102, 103, 104):
outputs, for the signal line 20 including the disconnection location, a first grayscale voltage V1 to the first signal line portion 20a, the first grayscale voltage V1 being corrected based on a position of the disconnection location and a wiring resistance R of the signal line 20 so as to be lower than the grayscale voltage V to be output to the signal line 20; and
outputs, for the signal line 20 including the disconnection location, a second grayscale voltage V2 to the second signal line portion 20b, the second grayscale voltage V2 being obtained by correcting the grayscale voltage V to be output to the signal line 20 based on the position of the disconnection location, a wiring resistance R of the signal line 20, and a wiring resistance R3 of the spare wiring 30, 130.

According to the above-mentioned configuration, in a case a disconnection is present in the signal line 20 in the plurality of signal lies 20 connected for each row or for each column of the plurality of display elements 11, the terminating end side of the second signal line portion 20b being separated from the first signal line portion 20a due to the disconnection is connected to the grayscale voltage output unit (2, 3, 4, 102, 103, 104) via the spare wiring 30, 130. Then, for the signal line 20 including the disconnection location, the grayscale voltage output unit (2, 3, 4, 102, 103, 104) outputs, to the first signal line portion 20a, the first grayscale voltage V1 being corrected based on the position of the disconnection location and the wiring resistance R of the signal line 20 so as to be lower than a grayscale voltage to be output to the signal line 20, and outputs, to the second signal line portion 20b, the second grayscale voltage V2 being obtained by correcting the grayscale voltage to be output to the signal line 20 based on the position of the disconnection location, the wiring resistance R of the signal line 20, and the wiring resistance R3 of the spare wiring 30, 130.

Moreover, in the display apparatus according to one embodiment, the grayscale voltage output unit (2, 3, 4, 102, 103, 104)
outputs, to the first signal line portion 20a, the first grayscale voltage V1 being corrected so as to decrease by a first correction voltage ΔV1 to be determined for each of the signal lines 20 including the disconnection location; and
outputs, to the second signal line portion 20b, the second grayscale voltage V2 being corrected so as to increase by a second correction voltage ΔV2 to be determined for each of the signal lines 20 including the disconnection location.

According to the above-mentioned embodiment, the first grayscale voltage V1 being corrected so as to decrease by the first correction voltage ΔV1 to be determined for each of the signal lines 20 including the disconnection location is output to the first signal line portion 20a, and the second grayscale voltage V2 being corrected so as to increase by the second correction voltage ΔV2 to be determined for each of the signal lines 20 including the disconnection location is output to the second signal line portion 20b, thereby making it possible to reduce luminance deviation between the first signal line portion 20a and the second signal line portion 20b in the signal line 20 including the disconnection location.

Moreover, in the display apparatus according to one embodiment, the grayscale voltage output unit (2, 3, 4, 102, 103, 104)
outputs, to the first signal line portion 20a, the first grayscale voltage V1 being corrected so as to decrease by a first correction voltage ΔV1 to be determined for each of the display elements 11 connected to the first signal line portion 20a; and
outputs, to the second signal line portion 20b, the second grayscale voltage V2 being corrected so as to increase by a second correction voltage ΔV2 to be determined for each of the display elements 11 connected to the second signal line portion 20b.

According to the above-mentioned embodiment, the first grayscale voltage V1 being corrected so as to decrease by the first correction voltage ΔV1 to be determined for each of the display elements 11 connected to the first signal line portion 20a is output to the first signal line portion 20a; and the second grayscale voltage V2 being corrected so as to increase by the second correction voltage ΔV2 to be determined for each of the display elements 11 connected to the second signal line portion 20b, making it possible to reduce luminance deviation for each of the display element 11 along the signal line 20 including the disconnection location.

Moreover, in the display apparatus according to one embodiment, the plurality of display elements 11 comprises display elements of a plurality of colors; and the grayscale voltage output unit (2, 3, 4, 102, 103, 104) changes the first correction voltage ΔV1 and the second correction voltage ΔV2 in accordance with the a luminosity factor of a color of the display element 11 connected to the signal line 20 including the disconnection location.

According to the above-mentioned embodiment, the gray scale voltage output unit (2, 3, 4, 102, 103, 104) corrects the first correction voltage ΔV1 and the second correction voltage ΔV2 in accordance with the luminosity factor of the color of the display element 11 connected to the signal line 20 including the disconnection location. In this way, luminance deviation for each primary color can be reduced.

Moreover, in the display apparatus according to one embodiment, the grayscale voltage output unit changes the first correction voltage and the second correction voltage to a greater correction voltage as a luminosity factor of the color of the display element connected to the signal line including the disconnection location is greater in the plurality of colors.

According to the above-mentioned embodiment, the grayscale voltage output unit (2, 3, 4, 102, 103, 104) changes the first correction voltage ΔV1 and the second correction voltage ΔV2 to a greater correction voltage as a luminosity factor of the color of the display element 11 connected to the signal line 20 including the disconnection location is greater in the plurality of colors. In this way, a color having a large luminosity factor, or, in other words, a color in which the effect by luminance deviation is large can be corrected.

DESCRIPTION OF REFERENCE NUMERALS

1 LIQUID CRYSTAL PANEL PORTION
2, 102 SOURCE DRIVER
3, 103 SOURCE SUBSTRATE
4, 104 TIMING CONTROLLER SUBSTRATE
10 TFT SIDE GLASS SUBSTRATE
11 THIN FILM TRANSISTOR (DISPLAY ELEMENT)
20 SOURCE LINE (SIGNAL LINE)
20a FIRST SOURCE LINE PORTION (FIRST SIGNAL LINE PORTION)
20b SECOND SOURCE LINE PORTION (SECOND SIGNAL LINE PORTION)
21 DATA LATCH CIRCUIT
22 D/A CONVERSION CIRCUIT
23 OUTPUT BUFFER CIRCUIT
30, 130 SPARE WIRING
40 TIMING CONTROLLER
41 SIGNAL INPUT CIRCUIT
42 VIDEO SIGNAL CORRECTION CIRCUIT
43 GATE DRIVER I/F CIRCUIT
44 SOURCE DRIVER I/F CIRCUIT
45 STORAGE UNIT
46 GRAYSCALE VOLTAGE GENERATION CIRCUIT
103a ADDITION AND SUBTRACTION CIRCUIT
140, 150 DETOURING WIRING

The invention claimed is:

1. A display apparatus, comprising:
a plurality of display elements arranged in a matrix in a display region of a panel substrate;
a plurality of signal lines connected for each row or each column of the plurality of display elements; and
a grayscale voltage output unit provided on one side of the panel substrate to output, to each one of the plurality of signal lines, a grayscale voltage based on a video signal, wherein
one signal line including a disconnection location in the plurality of signal lines is divided into a first signal line portion located at a side of the one side with respect to the disconnection location and a second signal line portion from the disconnection location to a terminating end,
a terminating end side with the terminating end of the second signal line portion is connected to the grayscale voltage output unit via a spare wiring, and
the grayscale voltage output unit:
outputs, for the one signal line, a first grayscale voltage to the first signal line portion, the first grayscale voltage being obtained by a correction of the grayscale voltage to be output to the one signal line, based on a position of the disconnection location and a wiring resistance of the one signal line, and the first grayscale voltage being smaller in absolute value than the grayscale voltage to be output to the one signal line before the correction; and outputs, for the one signal line, a second grayscale voltage to the second signal line portion, the second grayscale voltage being obtained by correcting the grayscale voltage to be output to the one signal line based on the position of the disconnection location, a wiring resistance of the one signal line, and a wiring resistance of the spare wiring.

2. The display apparatus according to claim 1, wherein the grayscale voltage output unit:

outputs, to the first signal line portion, the first grayscale voltage being corrected so as to be smaller in absolute value than the grayscale voltage to be output to the one signal line by a first correction voltage to be determined for each of the signal lines; and outputs, to the second signal line portion, the second grayscale voltage being corrected so as to be greater in absolute value than the grayscale voltage to be output to the one signal line by a second correction voltage to be determined for each of the signal lines.

3. The display apparatus according to claim 2, wherein:
the plurality of display elements comprises display elements of a plurality of colors; and
the grayscale voltage output unit changes the first correction voltage and the second correction voltage in accordance with a luminosity factor of a color of the display element connected to the one signal line.

4. The display apparatus according to claim 3, wherein the grayscale voltage output unit changes the first correction voltage and the second correction voltage to a greater correction voltage as a luminosity factor of a color of the display element connected to the one signal line is greater in the plurality of colors.

5. The display apparatus according to claim 1, wherein the grayscale voltage output unit:

outputs, to the first signal line portion, the first grayscale voltage being corrected so as to be smaller in absolute value than the grayscale voltage to be output to the one signal line by a first correction voltage to be determined for each of the display elements connected to the first signal line portion; and outputs, to the second signal line portion, the second grayscale voltage being corrected so as to be greater in absolute value than the grayscale voltage to be output to the one signal line by a second correction voltage to be determined for each of the display elements connected to the second signal line portion.

6. The display apparatus according to claim 1, wherein:
the grayscale voltage output unit comprises:
a source driver being connected to the one signal line; and
a processing circuit comprising a first terminal from which the first grayscale voltage is output and a second terminal from which the second grayscale voltage is output;

the first signal line portion is separated from the source driver and is connected to the processing circuit;

an output line of the source driver being separated from the first signal line portion is connected to the processing circuit; and the processing circuit corrects the grayscale voltage to be output to the one signal line to output the first grayscale voltage and the second grayscale voltage from the first terminal and the second terminal, respectively.

7. The display apparatus according to claim 6, wherein:
the grayscale voltage output unit further comprises a circuit substrate arranged at a side being opposite to the panel substrate with respect to the source driver;
the processing circuit is provided on the circuit substrate;
the starting end of the first signal line portion is connected to the first terminal; and
the terminating end of the second signal line portion is connected to the second terminal via the spare wiring.

* * * * *